United States Patent [19]

Samardzija et al.

[11] 4,050,708
[45] Sept. 27, 1977

[54] HAMPER AND CART

[75] Inventors: Momcilo M. Samardzija; Cheryl Samardzija, both of Merrillville, Ind.

[73] Assignee: The Raymond Lee Organization, Inc., New York, N.Y.

[21] Appl. No.: 676,317

[22] Filed: Apr. 12, 1976

[51] Int. Cl.² ............................................. B62D 1/12
[52] U.S. Cl. ........................................................ 280/47.26
[58] Field of Search ............... 280/47.24, 47.26, 47.27, 280/47.37, 645; 190/18 A

[56] References Cited

U.S. PATENT DOCUMENTS

| | | | |
|---|---|---|---|
| 1,299,829 | 4/1919 | Goodyear | 280/47.24 X |
| 3,087,740 | 4/1963 | Mitty | 280/47.26 |
| 3,494,667 | 2/1970 | Schlapman | 280/47.26 X |
| 3,508,746 | 4/1970 | Lindsay | 280/47.24 X |
| 3,934,895 | 1/1976 | Fox | 280/47.26 |

Primary Examiner—Joseph F. Peters, Jr.
Assistant Examiner—R. Schrecengost
Attorney, Agent, or Firm—Howard I. Podell

[57] ABSTRACT

A clothes hamper and a wheeled cart on which the hamper may be mounted in both a fixed upright position of the cart or transported with the axis of the cart inclined to the vertical. The cart is formed of a bent shaped plate shaped as an angle to form a pair of base flanges and a back rest and fitted to a telescopic handle, with a curved flange of the plate serving as a bearing for the mounting of an axle which supports a pair of cart wheels. The hamper is formed with a hinged cover, with legs projecting below the hamper base located so as to fit between the base support flanges of the cart so that in the erect position of the cart, the hamper legs rest directly on the floor supporting the cart wheels.

2 Claims, 3 Drawing Figures

HAMPER AND CART

SUMMARY OF THE INVENTION

Our invention is a clothes hamper and a wheeled cart on which the hamper may be mounted in both a fixed upright position of the cart or transported with the axis of the cart inclined to the vertical. The cart is formed of a bent shaped plate shaped as an angle to form a pair of base flanges and a back rest and fitted to a telescopic handle, with a curved flange of the plate serving as a bearing for the mounting of an axle which supports a pair of cart wheels. The hamper is formed with a hinged cover, with legs projecting below the hamper base located so as to fit between the base support flanges of the cart so that in the erect position of the cart, the hamper legs rest directly on the floor supporting the cart wheels.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
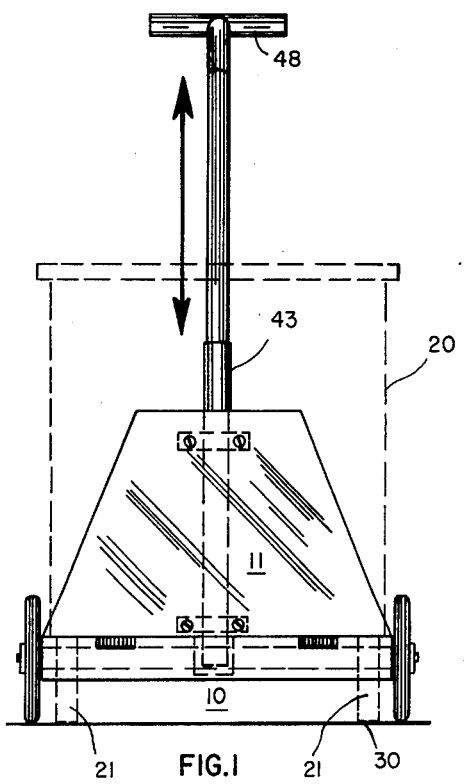
FIG. 1 is an elevation view of the cart.
Figure 2:
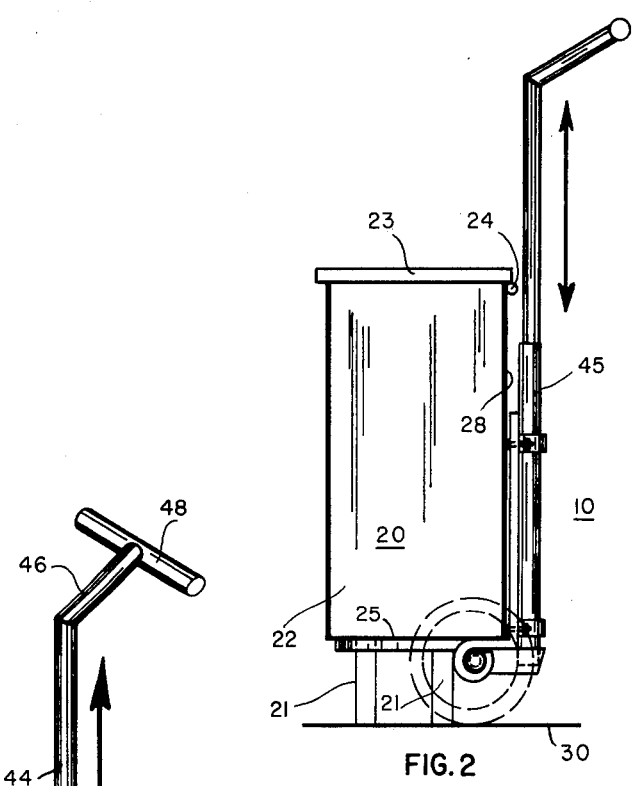
FIG. 2 is a side view of the cart and hamper.
Figure 3:
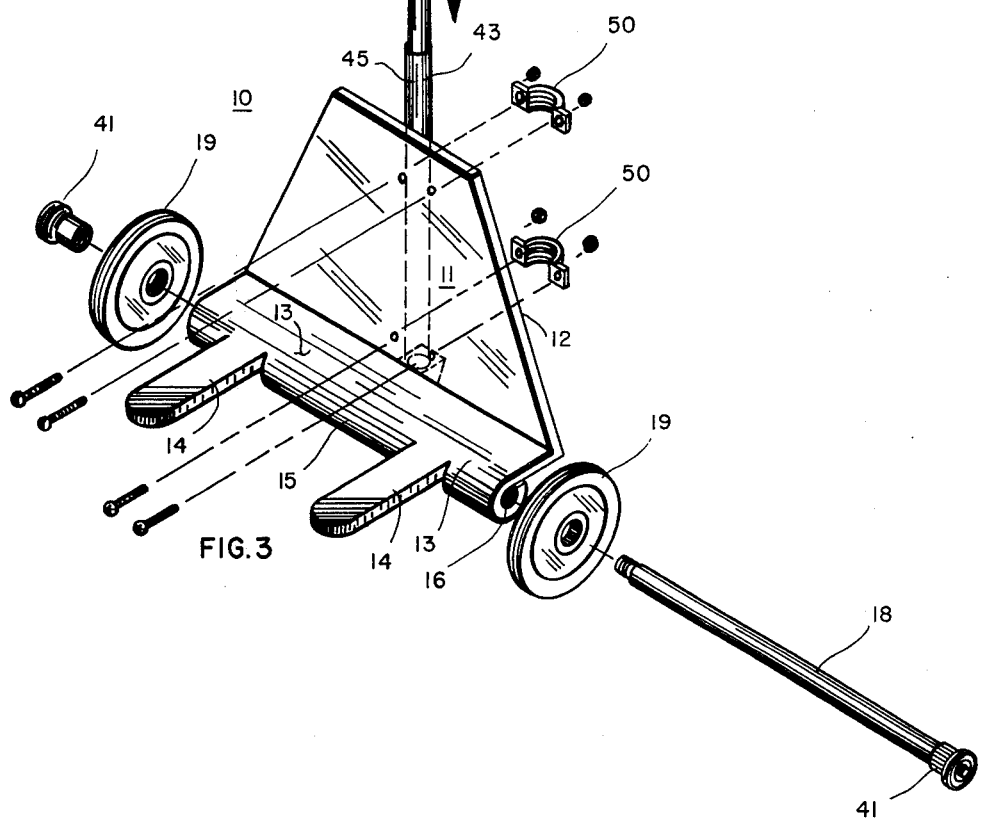
FIG. 3 is an exploded perspective view of the cart.

Turning now descriptively to the drawings, in which similar reference characters denote similar elements throughout the several views, FIGS. 1-3 illustrate the cart 10 which may be employed to transport the hamper 20, or alternately may be stored in the erect position with the hamper 20 resting directly on its own legs 21 on the floor 30. Cart 10 is formed of an angle plate 11 shaped vertical back section 12 joined to a horizontal base section 13. Base section 13 of plate 11 is formed of a pair of spaced finger sections 14 that extend from base section 13 in the plane of base section 13 and away from the flanged edge 15 of base section 13, which flanged edge 15 is shaped, in section, as a circular loop about an opening 16 of a size to serve as a bearing for an axle shaft 18. A pair of wheels 19 mount on axle shaft 18, about the opposed sides of base section 13, with end nuts 41, threaded to axle shaft 18 holding wheels 19 in place, when assembled.

A telescopic tubular handle assembly 43 is bolted by clamps 50 to the back surface of back section 12 of plate 11, with the upper end of handle assembly 43 formed as a tube 44 that slides within a tube 45 clamped to back section 12. Tube 44 is bent at its top section 46 away from the axis of tube 45 and fitted at its external end in a T-shaped handle section 48.

Hamper 29 is formed of a rectangular shaped box section 22 open at its top and fitted with a top cover 23 hinged to box section 22. Four legs 21 are mounted to the bottom plate 25 and located to project through the plane of cart base section 13 about base finger sections 14 and forward of base flange 15, with legs 21 each being of a length to reach the horizontal floor 30 on which wheels 19 rest when hamper 20 is located on cart 10 with the back side 28 resting against back section 12 and the bottom 25 of hamper 20 resting on base section 13 of cart 10, with the back section 12 of cart 10 aligned parallel to a vertical plane.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what we claim as new and desire to secure by Letters Patent of the United States is:

1. A cart on which a hamper may be mounted, formed of
   a base plate bent at right angles to form a back section and a base section,
   a telescopic handle asseembly mounted to the said back section of the base plate,
   said base section formed from a substantially rectangular section of the base plate, with
   a plurality of spaced flanges extending from the base plate, with each flange bent under the base plate about a common axis to form a closed circular tubular opening of the size to fit about an axle shaft,
   said flanges separated by a plurality of spaced finger sections extending from the base section in the general plane of the base plate,
   each said flange serving as a bearing support for a common axle shaft which shaft is fitted in the circular flange opeining, with
   a wheel mounted to said axle shaft on each side of the base plate.

2. The combination as recited in claim 1 together with
   a hamper resting on said base plate, and on said finger sections, said hamper fitted with projecting legs each located to project through the plane of the base plate in a space alongside a said finger section,
   said hamper legs each of a length to reach a horizontal surface on which the cart wheels rest when the base section is oriented parallel to the said horizontal section.

* * * * *